March 14, 1961 J. W. PFEFFER 2,974,695
SAW WITH TEETH HAVING WEAR-RESISTANT FACING PLATES
Filed Jan. 6, 1958

INVENTOR.
JOHN W. PFEFFER
BY

United States Patent Office 2,974,695
Patented Mar. 14, 1961

2,974,695

SAW WITH TEETH HAVING WEAR-RESISTANT FACING PLATES

John W. Pfeffer, N. 2818 Hamilton, Spokane, Wash., assignor of one-half to A. W. Pfeffer, Spokane, Wash.

Filed Jan. 6, 1958, Ser. No. 707,274

1 Claim. (Cl. 143—133)

My present invention relates to improvements in saws and more particularly in the cutting edges of saw teeth.

Throughout much of industry cutting saws are prevalent for many varied uses. These saws require considerable time and expense for setting and sharpening their teeth. It is customary in many industries of substantial size to employ one or more presons who are skilled in sharpening and maintaining such saws. Manifestly the metals from which the teeth are made must be as wear resistant as is practical with regard to the work for which each particular saw is employed.

To increase the resistance to wear and therefore decrease the frequency of sharpening, the use of relatively hard metal inserts is increasing among the trades. One practical illustration of this is seen in the recent increase in the demand for sintered carbide nibs and inserts on various types of tools and implements.

Sintered carbide, commonly abbreviated as "carbide" may be so hard that conventional files and sharpening means cannot be used to maintain it, but diamond wheels are required. The physical properties of carbide make its use desirable, but the expense of diamond wheels and machinery adapted to maintain instruments having carbide inserts or nibs is so great as to be prohibitive for the general run of small or medium-sized industries. At present diamond wheels cost approximatey $235, and the sharpening machinery to operate said diamond wheels costs approximately $2000. This results in the said industries, if they desire to use carbide inserts on their saws having to send their saws out to a shop equipped for such maintenance. Obviously time is required in transit in addition to the time required to complete the sharpening process, and since the operation of the industry must continue, it necessitates having a considerably increased quantity of spare saws over the normally required numbers to insure the continuing operations of the industries.

Additionally it has been found in practice, that because the personnel of the sharpening or maintenance department does not have the equipment and thus the ability to maintain the saws, their jobs are in jeopardy when such improved saws are permitted in the plant. A very real effort is therefore made by such personnel to discourage adoption of saws having hard metal cutting edges.

Much of this opposition to adoption of saws having cutting edges maintained by carbide or other relatively hard metal now known or to be later discovered or invented may be avoided by providing some inexpensive method or means by which the present implement maintenance personnel may successfully maintain such saws.

Heretofore the misconception has been held that the relatively hard metal, of which I shall use carbide as representative, must necessarily be indexed (that is, set in a recess formed in the parent metal) into the saw blade. The theory has been in the past that because of the brittle characteristic of hard metals, cutting pressures applied must be transmitted through the carbide insert as compression pressures directly to the body of the implement. Thence the insert is secured by one of many well known methods such as by set screws, blocks to prevent removal, brazing, etc.

I have discovered by considerable experimenting that it is erroneous to assume that the cutting pressures must be directed as compression pressures through the carbide to the parent body. This fallacy is largely responsible for the failure of others to envision the extremely large use of which carbide and similar metals are susceptible.

Basically, then, removal of the said fallacy results in my proposal to provide a hard metal cutting edge on saws and it therefore becomes an important object of this invention to provide a saw structure which will overcome all of the hereinbefore described adverse characteristics and opinions relative to the use of hard metal cutting edges on saw teeth.

In the accompanying drawings, like numerals are employed to designate like parts throughout the several views in which.

Figure 1:
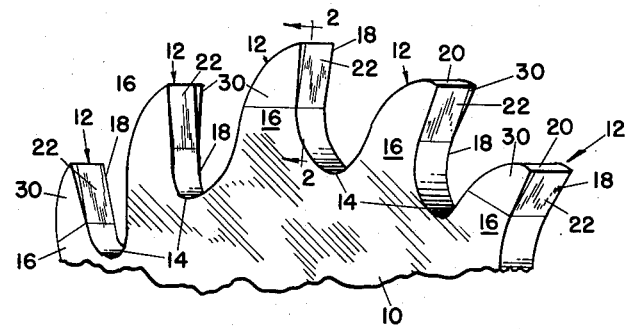
Figure 1 is a fragmentary perspective view of a circular saw including the present invention.

Having reference now with a greater degree of particularity to the drawings, the numeral 10 designates a disc type or circular saw blank made from the customary grade of steel. I term it a saw blank because the teeth 12 have not been sharpened or set as is the case when a conventional saw is completed. In conventional manner, each tooth is defined by inwardly projecting recesses or notches 14 which constitute throats. Each tooth includes a pair of side surfaces 16 and 18, a trailing edge 20 and a leading edge 2. Conventionally, on the saw type shown, each successive tooth is set or bent slightly transversely of the saw blade in the opposed direction from the next successive tooth. The leading edge 22 is filed at an angle relative to the axis of the saw, as indicated by the broken line 24 of Figure 3 and the tip is relieved at one side as indicated at 26 of Figure 2. It will thus be seen that conventionally the saw is provided with a cutting edge which extends from c to c as seen in Figure 2 at 28.

To a limited degree it is now conventional to index the leading edge 22 to receive a carbide insert, which insert is to be shaped in accordance with the conventional filing practices as 24 and 26. This has proven to be effective, but when the cutting edge at 28 becomes dull, it is required that the saw be sharpened by a diamond wheel with the attendant undesirabilities as hereinbefore described. Although it has never proven to be commercially accepted to any substantial degree, it is also public knowledge to index a side 16 or 18 of a tooth and provide an insert therein. In each case the inserts are secured by brazing with silver solder. Also in each case, the inserts are indexed (by indexed, I mean a recess is formed into which the insert is seated in such a manner that the cutting pressures are transmitted as compression pressures through the insert to the parent body, and when I use the term unindexed I mean that no recess is formed in that surface or part) and sufficient body thickness is present in the insert to defy sharpening the tooth with any of the conventional equipment found in most shops.

Figure 2:
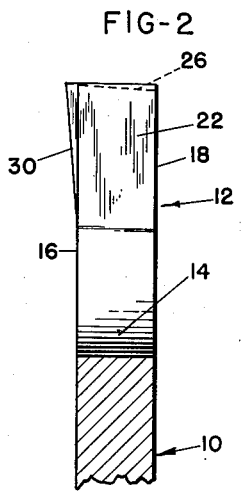
Figure 2 is a radial cross section taken on the plane indicated by the line 2—2 of Figure 1.

My experiments have proven, however, that the important cutting edge of each tooth as 12 is that angle where the leading edge 22 meets with the side face 16 or 18 and the trailing edge of the point 20 of the tip at approximately the cutting edge 28 defined between c—c of Figure 2. The thickness of the carbide facing plate radially inwardly from the tip of the tooth 12 is of no importance except as a means of supporting the carbide edge and such facing plate tapers toward the root of its tooth substantially to a feather edge to minimize the amount of hard stock which must be sharpened while providing set for the tooth.

Figure 3:
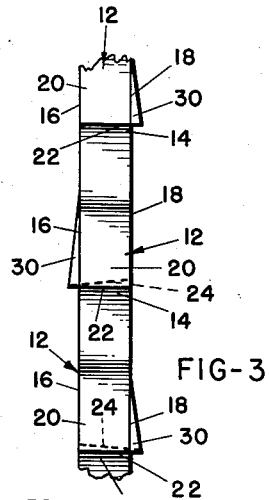
Figure 3 is a top or edge view of the saw of Figure 1.

I have successfully applied, by bonding a relatively thin preformed facing plate blank 30 of carbide, which is of generally triangular shape, to a side 16 or 18 of each tooth, a cutting edge 28 of carbide which is equally as resistant to wear as the previously described conventional insert indexed in the tooth face and yet one which may be sharpened and maintained in the conventional manner by a skilled saw filer employing conventional tools. Such facing plate blank, as shown in Figures 2 and 3, has substantially planar opposite faces which converge from a tip or an apex to an intersection at its opposite edge, forming susbtantially a feather edge, as shown in such figures. The thin carbide facing plate, when bonded to the saw blade with its leading edge substantially in registry with the face 22 of the tooth as seen in Figure 3 and with the tooth point 20 and its trailing edge projecting substantially as far as the tip and trailing edge of the facing plate, may be worked with a $6.50 green silicon wheel and theoretically with a manually operated filing stone and therefore becomes very desirable.

Theoretically, the inability of a person to "touch" the carbide inserts with conventional sharpening equipment is because the carbide is harder than the cutting or sharpening tool. This may not necessarily be true, however. My experimenting has indicated that the real reason is that even though the relative hardess of the tool is greater than the carbide insert it cannot be manually cut because the pressures required to indent into a large face of carbide are more than it is practical to apply and therefore no cutting or abrading can take place.

Conversely, it is assumed that when a thin edge of carbide material is presented, the pressures required to effect abrading are sufficiently less to bring it into the realm of practical manual effort.

It will be further noted that the teeth 12 may each be formed as shown at 24 and 26 when the blanks 30 are present. It will also be seen that the blanks need not conform to the exact tooth configuration, but may be relieved on the back as shown at 33 of Figure 4, being careful, of course, to maintain sufficient size to provide adequate anchoring by means of the brazing process with silver solder or an equivalent.

Figure 4:
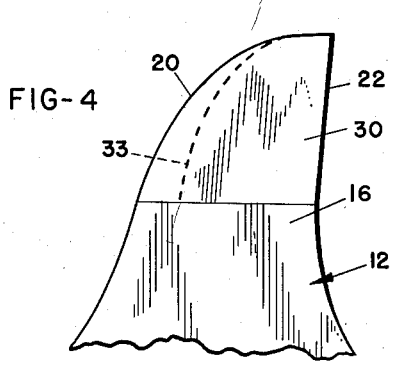
Figure 4 is an enlarged elevation of one tooth of the saw of Figure 1.

It will also be noted that requirements for "setting" and/or "relieving" the teeth is obviated when the preformed blanks 30 are applied to the side faces 16 and 18, as seen more graphically in Figures 3 and 4, since the preformed facing plate is bonded to a side of the tooth in the plane of a side of the saw blade 10 and projects laterally beyond the side of the blade as shown in Figures 2 and 3. Also such facing plate 30 tapers in thickness substantially to a feather edge from its tip adjacent to the tooth point 20 alongside the face of its tooth toward the root of its tooth and the edge of such facing plate opposite such tip to effect the desired lead or set and relief to the teeth.

Figure 6:
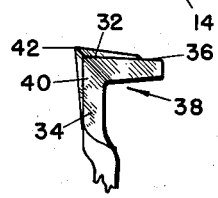
Figure 6 is a fragmentary lateral view taken on the plane indicated by line 6—6 of Figure 5.
Figure 5:
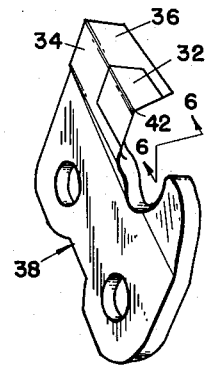
Figure 5 is a perspective view of a chisel link from a chain saw.

In Figures 5 and 6 I have shown the practice of my invention with respect to another type of saw. These views show a link of a chain-saw chain which is conventionally termed a chisel-link or a hooded tooth. This link has been found to be very effective for most types of wood found in the forests of the Northwestern States and under a wide variation of conditions. Because of the skill required to maintain a sharp edge on the chain saws with this type link, and the lack of such skill among the average chain-saw user, other types of chains, such as the chipper chain having an arcuate cutting edge which can be sharpened with a rat-tail instead of an angular file, have been enjoying a ready market while chain with the better tooth shape illustrated has been avoided.

In essence the invention is the same. That is, I apply by bonding thereto, a thin angular blank 32 of carbide or other relatively hard metal to the side and/or back surfaces 34 and 36 of the chisel tooth 38, which constitutes a link for a chain-saw chain. The face 40 is angularly sharpened then in such a manner as to form a cutting edge 42 at the juncture of the angular portions of the blank 32 or on the arc of the hooded link.

It is also to be noted that is no instance have I indexed, that is, formed a recess in the parent body of the saw blade, which is very costly and nearly prohibitive in many applications of use, but I bond the relatively thin facing plate on a side rather than on the face of the tooth. Because the blank is thin, the bonded joint can resist in shear the force of the cutting action on the facing plate. The cutting force on relatively thick blanks, however, produces a greater tendency to accidental removal of the nib or insert.

Having thus described my invention, I claim as new and desire to secure by Letters Patent of the United States the following:

A saw comprising blade means having opposite planar side faces and a series of teeth integral with said blade means and having sides coplanar with the opposite sides of said blade means, respectively, each tooth having a leading edge and a trailing edge meeting the leading edge, said blade means and said teeth being of substantially uniform thickness, and preformed, wear-resistant facing plates of material much harder than said blade means, each of said facing plates having a leading edge for cutting and a trailing edge meeting the leading edge at a tip, each such facing plate being bonded to a side of a tooth in the plane of the corresponding side of said blade means with its leading edge substantially in registry with the leading edge of such tooth and with the junction of the leading edge and trailing edge of such tooth projecting substantially as far as the tip of said facing plate, and each such facing plate projecting laterally beyond the side of said blade means and tapering from the facing plate tip toward the root of its tooth to provide set for the saw tooth.

References Cited in the file of this patent

UNITED STATES PATENTS

| | | |
|---|---|---|
| 2,565,814 | Haycock | Aug. 28, 1951 |
| 2,600,272 | Segal | June 10, 1952 |
| 2,658,537 | Ackley | Nov. 10, 1953 |
| 2,659,397 | Drake | Nov. 17, 1953 |
| 2,714,317 | Drake | Aug. 2, 1955 |

FOREIGN PATENTS

| | | |
|---|---|---|
| 537,764 | Great Britain | July 4, 1941 |
| 830,247 | Germany | Feb. 4, 1952 |
| 726,818 | Germany | Oct. 21, 1942 |
| 1,094,943 | France | Dec. 15, 1954 |